S. K. ROSSIGNOL.
TIRE.
APPLICATION FILED MAY 8, 1915.
1,168,113. Patented Jan. 11, 1916.
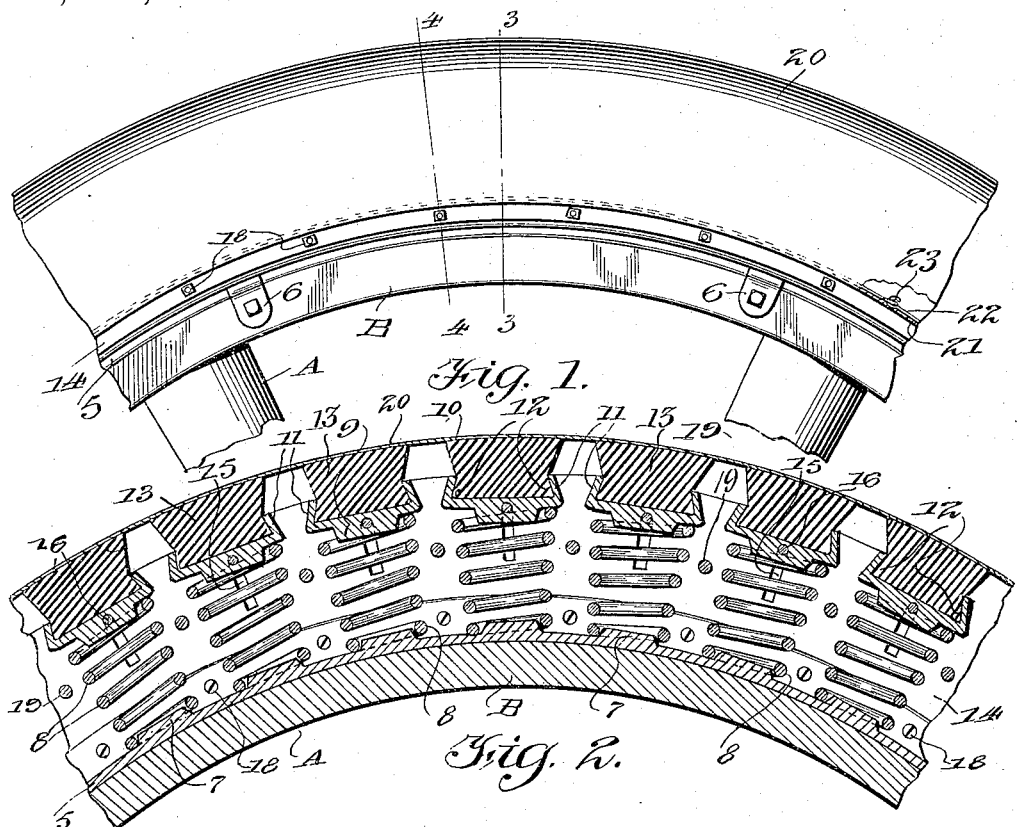
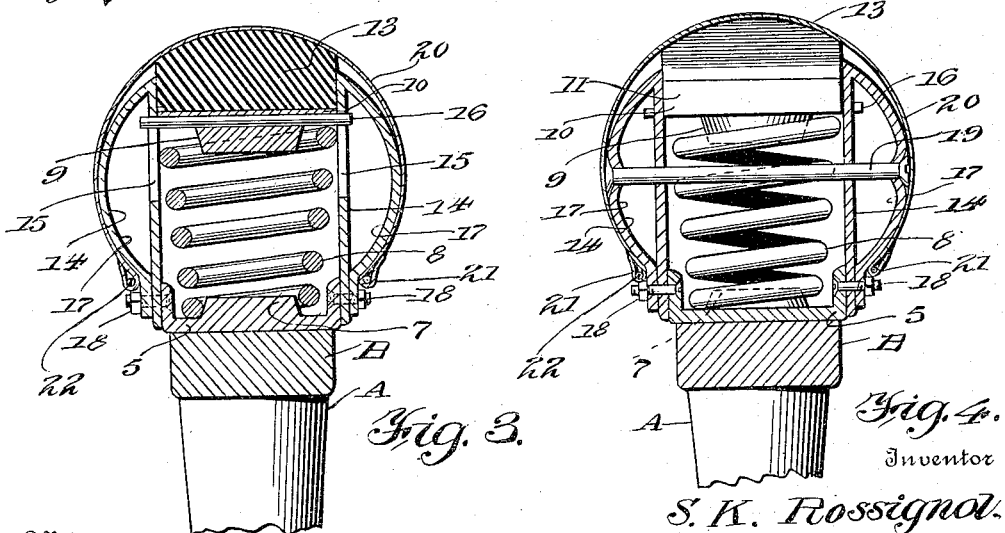
Witnesses
Frederick T. Moran
Inventor
S. K. Rossignol.
By Victor J. Evans
Attorney

UNITED STATES PATENT OFFICE.

SAMUEL K. ROSSIGNOL, OF GREENWOOD, SOUTH CAROLINA.

TIRE.

1,168,113.  Specification of Letters Patent.  Patented Jan. 11, 1916.

Application filed May 8, 1915. Serial No. 26,816.

*To all whom it may concern:*

Be it known that I, SAMUEL KERR ROSSIGNOL, a citizen of the United States, residing at Greenwood, in the county of Greenwood and State of South Carolina, have invented new and useful Improvements in Tires, of which the following is a specification.

The invention relates to tires, and has for its primary object to provide a tire wherein the same is rendered resilient and is held expanded without the use of air, thereby avoiding blow-outs and also increasing the life of the same.

Another object of the invention is the provision of a tire of this character wherein the same will absorb shocks and jars incident to the travel thereof, and also will have the requisite amount of resiliency and rigidity to withstand loads, the tire being of novel form to enable the mounting of the same on a vehicle wheel in a convenient manner.

A further object of the invention is the provision of a tire wherein the construction thereof obviates the necessity of the use of an excessive amount of rubber, which is only employed at the tread thereof.

A still further object of the invention is the provision of a tire of this character which is extremely simple in construction, strong, durable, reliable and efficient in its purpose, and inexpensive to manufacture.

With these and other objects in view, the invention consists in the construction, combination and arrangement of parts as will be hereinafter fully described, illustrated in the accompanying drawings, and pointed out in the claims hereunto appended.

In the drawing:—Figure 1 is a fragmentary side elevation of a wheel showing a tire constructed in accordance with the invention thereon. Fig. 2 is a longitudinal sectional view therethrough. Fig. 3 is an enlarged vertical transverse sectional view on the line 3—3 of Fig. 1. Fig. 4 is a sectional view on the line 4—4 of Fig. 1.

Similar reference characters indicate corresponding parts throughout the several views in the drawing.

Referring to the drawings in detail, A designates a portion of a vehicle wheel having a felly B about which is mounted the tire hereinafter fully described. Fixed to the outer periphery of the felly B is an externally channeled annulus 5 which is held upon the felly B through the medium of clips 6 disposed on opposite sides of the said felly and arranged at intervals circumferentially thereof, the said clips being bolted or otherwise secured to the felly. Formed in the channel of the annulus at equidistances apart are centering lugs 7 about which are coiled the inner ends of convoluted compression springs 8, the outer ends of which are coiled about bosses 9 formed on bearing plates 10 which are provided on opposite sides with flanges 11 to engage with the dove-tail shaped inner ends 12 adjacent thereto of tread blocks 13, preferably made from wood, although they may be made from resilient material, or composite material.

Secured to the annulus 5 at opposite sides thereof are guide rings 14, the same being formed with radially disposed slots 15 into which project pins 16, the latter being passed through bearing plates 10 so that in this manner the said plates have a limited movement when displaced, the pins 16 being normally engaged in the slots 15 at the outer ends thereof, yet are free for sliding movement in the said slots on the inward displacement of the tread of the said tire. The guide rings 14 are formed with outwardly bowed outer walls 17, the same, together with the inner walls of the rings 14, being bolted or otherwise fastened at 18 to the flanges formed by the channel in the annulus 5. At points between the location of the springs and passed through the outer walls 17 and inner walls of the guide plates 14 are cross bolts 19 which prevent the spreading of the guide plates and assist in fastening the same in their relative positions.

Disposed over the tread blocks 13 and outer walls 17 of the guide rings 14 is a covering or outer casing 20 preferably made from canvas, and it is formed at its edges with casings 21 through which are trained sectional wire rings 22, the sections of which are connected together through the medium of the hook ends 23 thereon, and these rings 22 serve to hold the casing covering in place.

From the foregoing description, taken in connection with the accompanying drawing, it is thought that the construction of the device will be clearly understood, and therefore a more extended explanation has been omitted.

What is claimed is:—

1. A tire comprising a substantially U-shaped annulus adapted to be mounted on the felly of a wheel, side rings fixed to the said annulus and having radially disposed slots at intervals throughout the circumference thereof, outwardly bulged portions formed on the side rings, tread blocks supported between the side rings, bosses formed within the channels in the U-shaped annulus, bearing disks supporting the said tread blocks, guide pins passed through the bearing disks and slidably engaged in the said slots, and resilient elements interposed between the said disks and the annulus and engaged on the bosses.

2. A tire comprising a substantially U-shaped annulus adapted to be mounted on the felly of a wheel, side rings fixed to the said annulus and having radially disposed slots at intervals throughout the circumference thereof, outwardly bulged portions formed on the side rings, tread blocks supported between the side rings, bosses formed within the channels in the U-shaped annulus, bearing disks supporting the said tread blocks, guide pins passed through the bearing disks and slidably engaged in the said slots, resilient elements interposed between the said disks and the annulus and engaged on the bosses, and tie members passed through the side rings and engaged in the outwardly bowed portions thereof at points between the resilient elements.

3. A tire comprising a substantially U-shaped annulus adapted to be mounted on the felly of a wheel, side rings fixed to the said annulus and having radially disposed slots at intervals throughout the circumference thereof, outwardly bulged portions formed on the side rings, tread blocks supported between the side rings, bosses formed within the channels in the U-shaped annulus, bearing disks supporting the said tread blocks, guide pins passed through the bearing disks and slidably engaged in the said slots, resilient elements interposed between the said disks and the annulus and engaged on the bosses, tie members passed through the side rings and engaged in the outwardly bowed portions thereof at points between the resilient elements, and a flexible covering inclosing the tread blocks and disposed outside of the outwardly bowed portions of the ring.

In testimony whereof I affix my signature in presence of two witnesses.

SAMUEL K. ROSSIGNOL.

Witnesses:
M. C. TAGGART,
J. P. ABNEY.

Copies of this patent may be obtained for five cents each, by addressing the "Commissioner of Patents, Washington, D. C."